S. E. OLIVER.
APPARATUS FOR COLLECTING OLEORESIN.
APPLICATION FILED DEC. 10, 1919.
1,379,358.  Patented May 24, 1921.
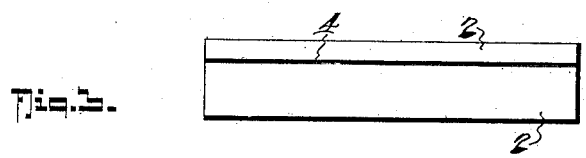
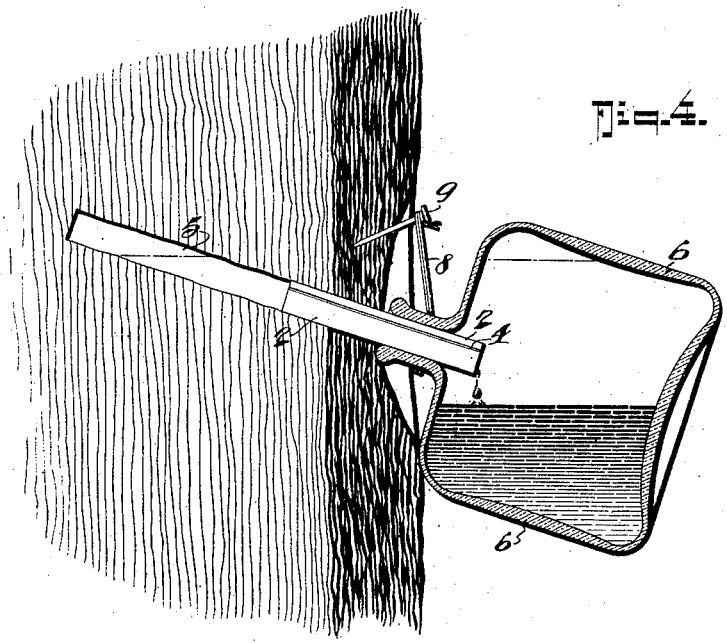
Inventor
Samuel E. Oliver.
By Fred G. Dieterich
Attorneys

UNITED STATES PATENT OFFICE.

SAMUEL E. OLIVER, OF VANCOUVER, BRITISH COLUMBIA, CANADA.

APPARATUS FOR COLLECTING OLEORESIN.

1,379,358.  Specification of Letters Patent.  Patented May 24, 1921.

Application filed December 10, 1919. Serial No. 343,900.

*To all whom it may concern:*

Be it known that I, SAMUEL E. OLIVER, a citizen of the Dominion of Canada, residing at Vancouver, in the Province of British Columbia, Canada, have invented certain new and useful Improvements in Apparatus for Collecting Oleoresin, of which the following is a specification.

This invention relates to a means for tapping oleo-resins or the like from trees and the object is to prevent evaporation of the volatile constituents of the liquid and prevent oxidation of it, as it is drawn from the tree, and to attain these results in a simple, inexpensive and effective manner.

The invention is particularly described in the following specification, reference being made to the drawings by which it is accompanied, in which:

Figure 1 is an end view of the tubular connection used.

Fig. 2 is a similar view showing the same tube as contracted to fit the tapping duct of the tree and the neck of the container.

Fig. 3 is a side elevation of the tube, and

Fig. 4 shows the application of the device as used in tapping a tree.

The device comprises a resiliently contractible tube 2 of thin sheet metal bent to a cylindrical form, the diameter of which, as shown in Fig. 1, is slightly in excess of the diameter of the tapping hole 5 in the tree. The tapping hole 5 is preferably half an inch in diameter and the connecting tube 2 about five-eighths of an inch, when free. One edge of the tube material is turned inward, as at 3, and the other edge 4 overlaps the edge which is inwardly turned. Half the length of this tube 2, which is about three inches long, is passed into the tapping hole 5 of the tree which is drilled upward at approximately fifteen degrees from the horizontal, and the other half is inserted into the neck of the bottle or container 6, the aperture of which is one-half inch to correspond to the tapping hole 5. The end of the bottle neck is pressed close up to the bark of the tree at the aperture, the roughness of the bark being merely dressed off before boring.

The connecting tube 2 being outwardly expansible under its own resilience closely fits the aperture 5 of the tree and the neck of the bottle 6, and thus effectively closes the connection between the duct and the container to the exclusion of air and prevents evaporation of the volatile constituents.

Any small leakage in the connection is rapidly sealed by the liquid itself which oxidizes in any small interstices through which it may pass.

As a provision to retain the bottle 6 against accidental dislodgment, a piece of light wire 8 may be passed once or twice around the neck and its ends are made fast to a nail 9 driven into the tree above the aperture.

The inwardly turned edge 3 of the tube rectifies and imparts a certain measure of rigidity to that edge to support the other edge 4, when overlapped, and thus provides a more effective joint along the tube when inserted in the tapping hole and bottle neck.

The length of the tube is sufficient to afford the required support to the container and to conduct the liquid through the looser structure of the outer bark of the tree and through the inner bark. The roughness of the external surface of the bark only requires to be smoothed off where the tapping hole is entered. The tapping holes are made about two or three feet from the ground, so that they are below the place of cutting of the mature tree, and according to the experience of the U. S. Forestry Department the withdrawal of the oleo-resin from a growing tree is not only not injurious to its growth, but is distinctly beneficial to the timber afterward to be cut from it.

Preference is given to a tapping hole of relatively small diameter that the initial volume of air, unavoidably shut up in it when the container is applied, may be as small as practicable in relation to the exposed surface of the bore. Obviously the surface of the bore varies directly with its diameter while the volume varies as the square of the diameter.

Although the subject matter of this invention may appear trifling, it is all-important in the successful attainment of the desired object.

The customary European practice in tapping living trees for oleo-resinous liquids is to bore a tapping hole one inch in diameter and insert a tubular spout to deliver the liquid into an open container.

The common American practice is to locally remove the outer bark of the tree and scarify the exposed surface with cuts or scores which are angled downward to a vertical medial line, and an open container is connected beneath to receive the drip.

In neither of these methods is any provision taken to prevent evaporation and oxidation. The oxidation not only materially changes the nature of the product, and that in a manner that cannot be commercially restored, but it rapidly seals the small sap ducts of the tree, so that the flow soon ceases, and it becomes necessary in one case to constantly enlarge the duct, and in the other to rescarify the exposed surface, in order to maintain a flow.

Attempt has also been made to withdraw the flow of the oleo-resin by means of a vacuum, which process, while it prevents oxidation, is not practicable as the apparatus is relatively expensive in both first cost and maintenance, and in applying it, it is necessary to bark the tree over a relatively considerable area and to joint the receiver against the tree.

The invention, which is the subject of this application, is extremely simple and is trifling in cost. With it the collection can be conducted over a large area of growing trees with a minimum expense in attendance, as the bottles can be quickly removed, emptied, and returned, the frequency of attendance being dependent on the flow according to the season.

If the container is not emptied before it is full, it will fill to within a small fraction of its capacity and as the liquid rises within the tapping hole the flow stops but immediately resumes when the container is emptied and replaced.

Having now particularly described my invention, I hereby declare that what I claim as new and desire to be protected in by Letters Patent, is:

1. In apparatus for collecting oleo-resin, an outwardly expansible tubular member adapted to be inserted into the auger hole in the trunk of the tree to be tapped and a suitable container into which said outwardly expansible tubular member is partly inserted, and means for supporting the container on the tree.

2. In apparatus for collecting oleo-resin, a tube bent from thin resilient sheet material to a diameter slightly greater than the auger hole into which it is to be inserted with one edge of the sheet overlapping the other and a container socketed on the upper projecting end of the tube.

3. In apparatus for collecting oleo-resin, a tube bent from thin resilient sheet material to a diameter slightly greater than the auger hole into which it is to be inserted with one edge of the sheet overlapping the other, a container socketed on the upper projecting end of the tube, the inner edge of the overlap of the sheet being bent inwardly substantially normal to the circle.

In testimony whereof I affix my signature.

SAMUEL E. OLIVER.